Patented Feb. 19, 1929.

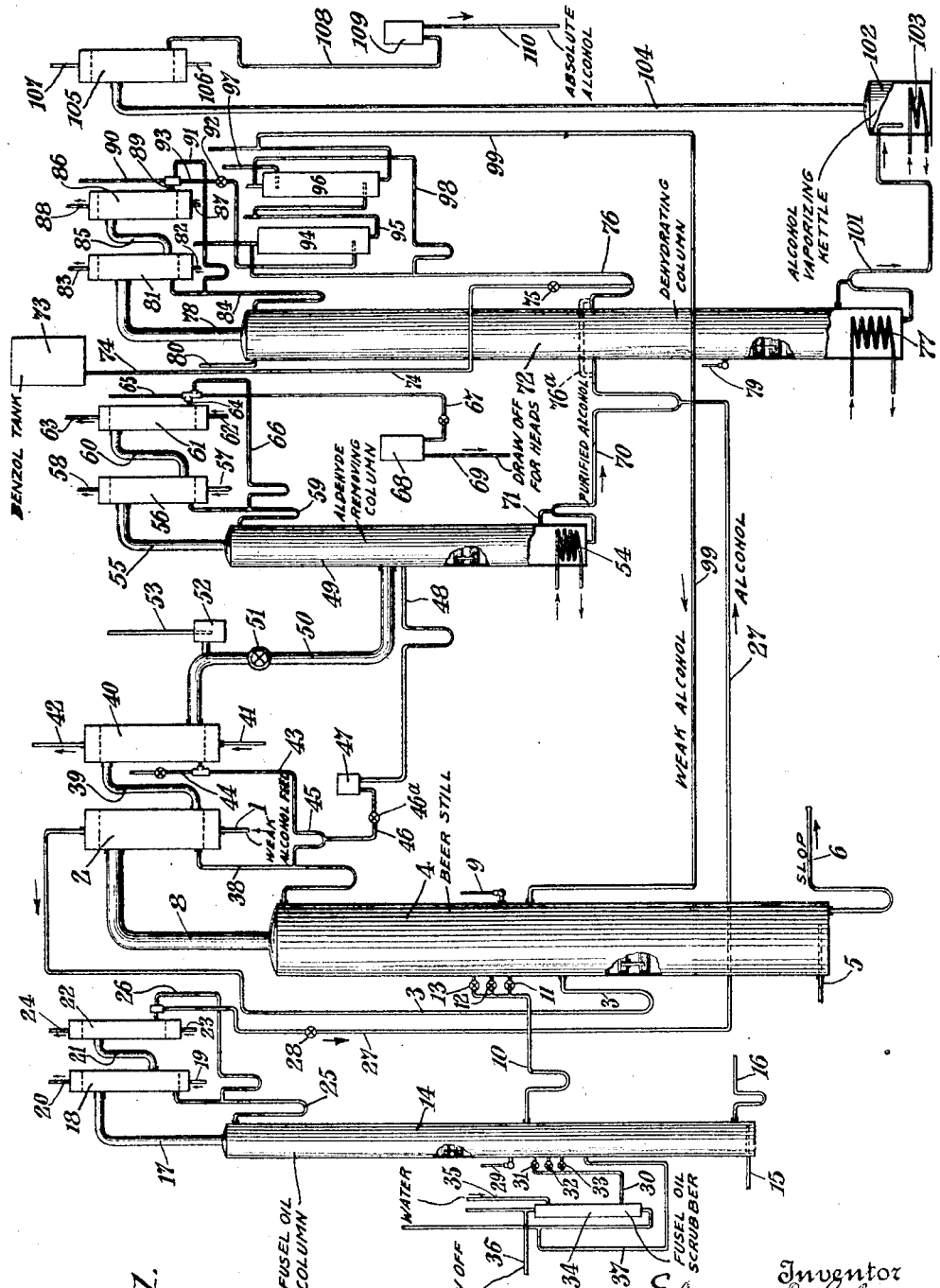

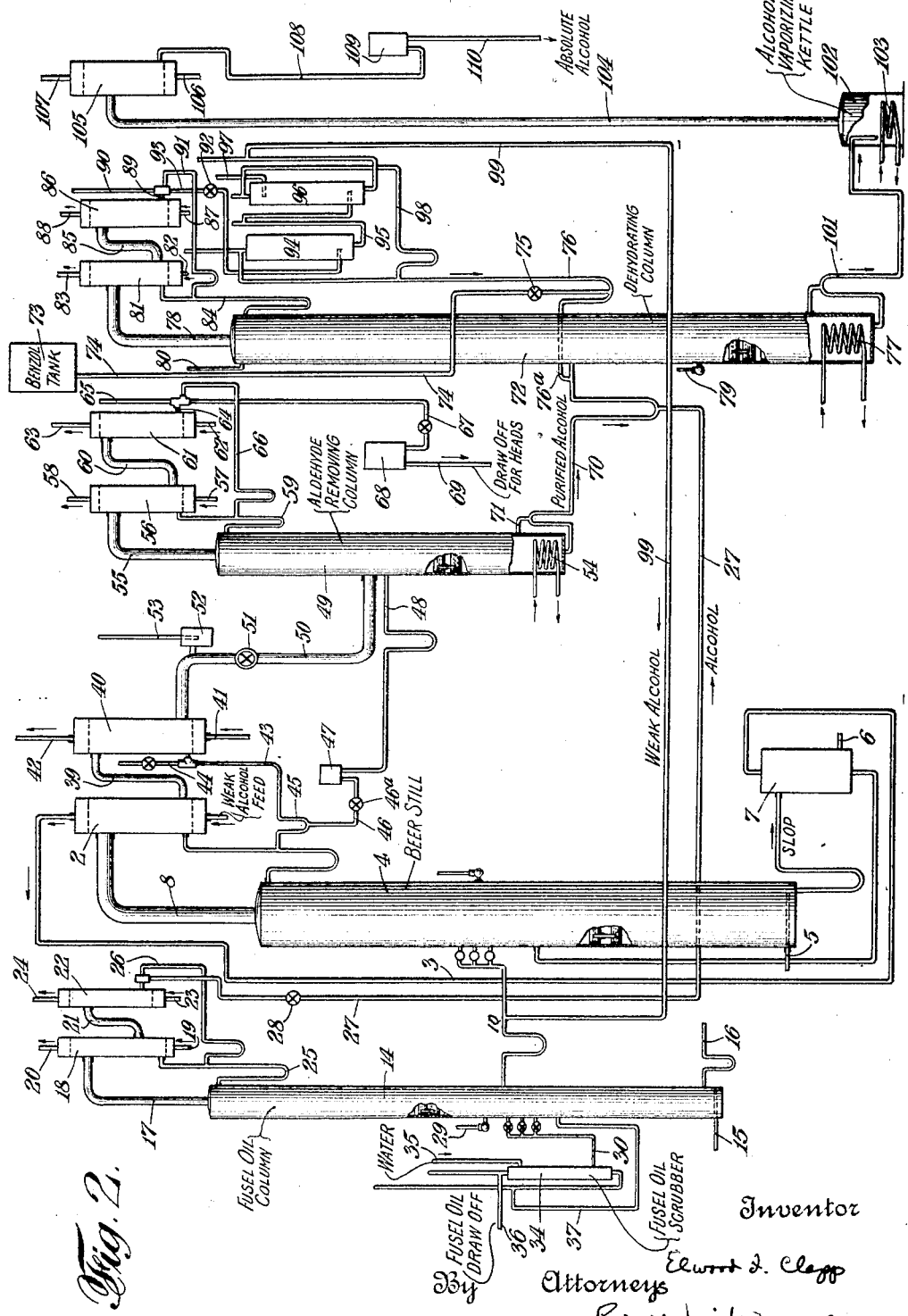

1,702,495

UNITED STATES PATENT OFFICE.

ELWOOD I. CLAPP, OF BALTIMORE, MARYLAND, ASSIGNOR TO U. S. INDUSTRIAL ALCOHOL CO., A CORPORATION OF WEST VIRGINIA.

PROCESS FOR PRODUCING ABSOLUTE ALCOHOL.

Application filed May 18, 1925. Serial No. 30,926.

My invention relates to the production of absolute alcohol in an advantageous manner, from alcohol of comparatively low strength.

The object of my invention is to provide a process whereby absolute alcohol may be obtained from alcohol having a low strength and which has many advantages over previous processes provided for this purpose. The object of my invention is particularly to provide a continuous process for the production of absolute alcohol from beer. My present process contains, among others, the following important features. In the course of my process the alcohol is fed while hot into the dehydrating column, thus eliminating the cost of supplying steam to heat the liquid up to the temperature at which it is fed into the dehydrating column. In accomplishing this, my process comprises, in general, a beer still treatment from which the alcohol of approximately 95% strength is fed directly into the dehydrating column, thus eliminating the column previously used, as set forth in my application upon absolute alcohol process, Serial No. 750,519, filed November 18, 1924, for bringing the dilute alcohol obtained from the constant boiling mixture evolved at the top of the dehydrating column up to 95% strength. In addition, my process comprises the treatment of the fusel oil obtained from the beer still so as to remove ethyl alcohol and water therefrom and deliver a washed fusel oil capable of being utilized as commercial fusel oil. One feature of the fusel oil treatment is to recover the alcohol obtained in washing the fusel oil and to return all the alcohol obtained in the fusel oil treatment back to the beer still. There is also a saving in avoiding at this point, any separate distillation of the alcohol from the fusel oil treatment. This fusel oil treatment is a distinct advantage as compared with the operation of the process as set forth in my application upon process for the distillation of alcohol, Serial No. 1,597, filed January 10, 1925. Also, another feature of my process is, if desired, to return the dilute alcohol obtained in the separation chamber connected to the dehydration column, to the fusel oil column instead of to the beer still, thus obtaining a more concentrated slop from the bottom of the beer still. Still another feature of importance in my process is the redistillation of the absolute alcohol so as to remove any foreign materials, such as dirt or other solid matter that may accumulate in the alcohol while passing through the process. By carrying out the process continuously in this way there is, in general, a decided saving, also, because of the avoidance of the use of extensive storage tanks that would be necessary if the process were carried out otherwise. Furthermore, the product is particularly pure owing to the removal of the foreign solid materials therefrom. In general, a better control of the entire process is obtainable and at a lower cost of operation, and a more uniform product, both in the case of the absolute alcohol and commercial fusel oil, is obtained.

Further objects of my invention will appear from the description of the same hereinafter in detail.

While my invention is capable of being carried out in connection with many different types of apparatus, by way of illustration I have shown only certain types of apparatus for use in connection therewith, in the accompanying drawings, in which—

Fig. 1 is a diagrammatic view of an apparatus for use in connection with my invention, and Fig. 2 is a modification of the same.

For example, in carrying out my invention I may supply beer containing approximately 5 to 10% by volume of ethyl alcohol, through a pipe 1 to a dephlegmator 2 from which the beer passes by a trapped pipe 3 to a beer still 4. The beer still 4 may be heated with live steam supplied through a pipe 5, or may, instead, be provided with the usual type of heater for supplying indirect heat such as is used in connection with an alcohol still. The slop, substantially free from alcohol, from the beer still passes out by means of a trapped pipe 6 which may, if desired, pass through a preheater 7 through which the pipe 3 may be made to pass, as shown in Fig. 2 in the drawings. The vapors from the beer still 4 pass out of the column by means of a pipe 8 to the dephlegmator 2, said vapors having been obtained by reason of the countercurrent of steam in the beer still 4 flowing upwardly against the descending current of liquid. Slightly above the beer inlet of the pipe 3 there is provided a thermometer 9 so as to maintain the temperature at this part of the column at approximately 89° C. so as to obtain alcohol vapors having a strength of 95 to 96%, after passing through the upper part of the column 4, which acts as a rectifying unit. The high boiling impurities accumulate to their greatest strength slightly above the beer inlet 3 and, accordingly, a draw-off trapped pipe 10 is provided, having three valved connections 11, 12 and 13, to different plates in the beer still at this part of the same. The pipe 10 leads to a fusel oil column 14 at a point substantially 20 plates from the bottom of the same, said column having in all approximately 45 plates. The column 14 is heated by the introduction of live steam into the bottom of the column through a pipe 15. As the fusel oil descends in the column 14, water separated from the fusel oil passes out of the bottom of the column 14 by means of a trapped pipe 16 and vapors comprising approximately 95% by volume of ethyl alcohol and substantially free from fusel oil, pass out from the top of the column by means of a pipe 17 to a dephlegmator 18 cooled by a current of water supplied by an inlet pipe 19 and an outlet pipe 20 and thence by a pipe 21 to a condenser 22 having a water inlet pipe 23 and a water outlet pipe 24. The condensate from the dephlegmator 18 returns to the top of the column 14 by means of a trapped pipe 25 and a part of the condensate obtained in the condenser 22 also passes back to the top of the column through a pipe 26, which is connected to the pipe 25. The remainder of the condensate of alcohol from the condenser 22 is fed by a pipe 27 having a valve 28, to the dehydrating column to be hereinafter referred to. In order to maintain the fusel oil column 14 at the desired temperature, a thermometer 29 is provided thereon just above the fusel oil inlet pipe 10 as it is found desirable to maintain a temperature of approximately 91° C. at this point in the column in order to insure uniform operation and complete separation of the fusel oil. This temperature may be maintained by regulating the portion of the condensate drawn off by the pipe 27 to the dehydrating column. The fusel oil accumulates in the column 14 at a point just below the feed pipe 10, where it is drawn off by means of a pipe 30 having three valved connections 31, 32 and 33 leading to different plates at this point in the column and the fusel oil is then conveyed to a scrubber 34 where it is washed with a current of water supplied by means of a pipe 35. The contents of the scrubber 34 separate into two layers, the upper, or fusel oil layer being drawn off through a vented pipe 36 and the lower, or water layer being allowed to pass out of the scrubber by means of a vented pipe 37 arranged to convey the wash water containing some alcohol, back to the fusel oil column 14. The fusel oil obtained in this way is sufficiently high grade to be marketed as crude fusel oil but can, if desired, be further purified by distillation and rectification.

The condensate obtained in the dephlegmator 2, which is connected to the beer still 4, is returned to the top of the beer still through a trapped pipe 38 and the vapors pass out of the same through a pipe 39 to a condenser 40 cooled with water by means of an inlet pipe 41 and an outlet pipe 42. The condensate from the condenser 40 is drawn off by a pipe 43 having a valved vent 44 and a trap 45, said trap being connected to the pipe 38 to return a portion of the condensate to the upper part of the beer still and also being provided with a pipe 46 having a valve 46ª, which leads to a tail-box 47 connected by a trapped pipe 48 to a purification column 49. Any vapors which are not condensed in the condenser 40 pass out of the same by means of a vapor pipe 50 having a valve 51, to the side of the purification column 49, said vapor pipe 50 being provided with a safety liquid sealed box 52 provided with a vent 53. By the operation of the valve 46ª, or by controlling the flow of water through the pipes 41 and 42, or both, the temperature in the beer still 4, as indicated by the thermometer 9, may be controlled so as to obtain the desired temperature of 89° C., inasmuch as any rise in the temperature is counteracted by increasing the amount of liquid refluxing to the top of the column 4.

The column 49 is heated by a steam coil 54 and consequently, the aldehydes and other low boiling constituents, as well as some alcohol, pass out of the column through a vapor pipe 55 to a dephlegmator 56 cooled with a current of water by means of inlet and outlet pipes 57 and 58. The condensate from the dephlegmator 56 returns by a trapped pipe 59 to the top of the column 49 and the uncondensed vapors are conveyed by a pipe 60 to a condenser 61 cooled with a current of cold water, by means of an inlet pipe 62 and an outlet pipe 63. The condensate thus obtained from the condenser 61 passes out of the same by means of a pipe 64 which contains a vent 65 to convey away any uncondensed gases. From this point a part of the condensate returns by a trapped pipe 66 to the pipe 59 and thence to the column 49, and the remainder of the heads are conveyed away by a valved pipe 67 to a tail-box 68 from which the same may be drawn off by a pipe 69. The alcohol which has been purified in this way in the column 49, and which has a strength of 95 to 96%, is conveyed from the column 49 by means of a trapped pipe 70 having a vent 71 leading back to the column 49. The alcohol is thence conveyed to the side of a dehydrating column 72. It will be noted from the drawings that the pipe 27 is also connected to the pipe 70 so as to convey the alcohol from the condenser 22 to the dehydrating column 72. In order to dehydrate the alcohol in the column 72 with the aid of a third liquid, any desired third liquid may be used for this purpose which forms a constant boiling mixture with the alcohol having a lower boiling point than the alcohol and the water present therein, but for this purpose I prefer to use benzol. Accordingly, sufficient benzol is supplied to the column 72 from a benzol tank 73 having a pipe 74 provided with a valve 75 which is connected to a trapped pipe 76 leading to the side of the column 72.

It will be noted that the benzol enters the column 72 at the same plate as in the case of the pipe 70 conveying the alcohol thereto. If desired, also, it will be understood that the alcohol and benzol may be mixed together previous to conveying the same into the column 72. Any suitable heater for the lower end of the column 72 may be used but for this purpose I have provided a steam coil 77 and the amount of steam supplied to the heater may be regulated in any suitable manner to maintain a sufficient pressure therein. When conditions of equilibrium are obtained in the column 72, a constant boiling ternary mixture comprising approximately, by weight—

18.5% ethyl alcohol
74.1% benzol
7.4% water will be evolved from the top of the column 72 through a pipe 78. In order to secure these operating conditions a thermometer 79 is provided in the column so as to maintain at this point a temperature of approximately 79° C. At this point the alcohol contains a slight trace of benzol. If the temperature there increases above this temperature, this would be an indication of the leakage of benzol or loss of the benzol in the wash water or incomplete removal of the same from the alcohol, and, accordingly, some further benzol would then be added from the tank 62 to supply the loss. Furthermore, in obtaining the constant boiling ternary mixture at the top of the column it is desirable to obtain a temperature at that portion of the apparatus of approximately 65° C., a thermometer 80 being provided for that purpose. The number of plates in the column 72, above the pipes 70 and 76, should be sufficient to produce the constant boiling ternary mixture at the top plate. The vapors from the column 72 which pass out through the pipe 78, are conveyed to a dephlegmator 81, cooled with a current of water by means of an inlet pipe 82 and an outlet pipe 83. The condensate is returned by a pipe 84 to the top of the column 72 as a reflux and the uncondensed vapors then pass through a pipe 85 to a condenser 86, cooled with a current of water by means of an inlet pipe 87 and an outlet pipe 88, where the vapors are condensed and cooled. The current of water supplied to the dephlegmator 81 and the condenser 86 may be controlled in any suitable way. The condensate passes out by a pipe 89 having a vent 90 and part of the condensate is returned by a trapped pipe 91 to the pipe 84 to be returned to the column 72. The portion returned by the pipe 91 is controlled by a valve 92 in an outlet pipe 93 for the main portion of the condensate, which conveys the same to a separating chamber 94 where the liquid separates into two layers. The top layer containing principally benzol comprises approximately by volume, 86.5% benzol
13.2% alcohol and
0.3% water.

while the lower layer, containing mostly aqueous alcohol, comprises approximately by volume—

11.1% benzol
56.4% alcohol and
32.5% water.

The upper, or benzol layer, passes out of the separating chamber 94 to the vented trapped pipe 76. If desired, however, the pipe 76, instead of entering the column 72 directly, may be connected to the dilute alcohol inlet pipe 70 by means of a pipe 76ª, as shown in Fig. 2, so that the benzol, alcohol and the benzol and alcohol obtained from the ternary mixture, may be mixed outside of the column before entering the same. The bottom layer passes out of the separator 94 by means of a vented pipe 95 which is arranged to act as a level regulating device, and thence to a scrubber 96 where the liquid is washed by means of water fed into the same through a pipe 97. This results in the formation of two liquid layers in the scrubber 96, the upper layer containing substantially all of the benzol remaining in the liquid, and comprising approximately, by volume—

96.3% benzol
3.7% alcohol and
0.0% water and this upper layer is conveyed by a trapped pipe 98 to the pipe 76 and thence back to the column 72. In this way substantially all of the benzol is returned to be used over again in the process. In the scrubber the lower layer, comprising wash water, and containing by volume—

0.1% benzol
25 % alcohol and
74.9% water is conveyed by a pipe 99 to the beer still 4. However, if a more concentrated slop is desired at the bottom of the beer still, the dilute alcohol from the pipe 99, instead of being conducted to the column 4, may be conveyed direct by a pipe 100, to the fusel oil discharge pipe 10, as shown in Fig. 2. Absolute alcohol is thus obtained in the column 72 and passes out by a vented pipe 101 to a distilling kettle 102 where the alcohol is vaporized by means of a heating coil 103 supplied with a current of steam. This vaporized alcohol passes up by a pipe 104 to a condenser 105 supplied with cooling water by an inlet pipe 106 and an outlet pipe 107, the condensed alcohol flowing out by a pipe 108 to a tail-box 109 from which a pipe 110 conveys the purified absolute alcohol to any desired point. This final distillation removes any solid materials which may have been accumulated by the liquid in the course of the operations in the apparatus.

While I have described my invention above in detail I wish it to be understood that many changes may be made therein without departing from the spirit of the same.

I claim:

1. The process which comprises distilling a weak alcohol newly supplied to the process containing water so as to obtain aqueous liquid alcohol of high strength, subjecting the liquid alcohol of high strength obtained therefrom to dehydration by distillation with a third liquid adapted to form an azeotropic mixture with the alcohol and water, so as to obtain dehydrated alcohol and some alcohol of less strength than the dehydrated alcohol, and distilling with said weak alcohol said alcohol of less strength after the removal of the third liquid from the latter.

2. The process which comprises distilling a weak alcohol supply containing water so as to obtain hot aqueous liquid alcohol of high strength, and subjecting the liquid alcohol of high strength obtained therefrom to dehydration by distillation while still hot with a third liquid adapted to form an azeotropic mixture with the alcohol and water.

3. The continuous process which comprises distilling a weak alcohol newly supplied to the process containing water so as to obtain aqueous liquid alcohol of high strength, subjecting the liquid alcohol of high strength obtained therefrom to dehydration by distillation with a third liquid adapted to form an azeotropic mixture with the alcohol and water, so as to obtain dehydrated alcohol and some alcohol of less strength than the dehydrated alcohol and distilling with said weak alcohol said alcohol of less strength after the removal of the third liquid from the latter.

4. The process which comprises distilling weak alcohol containing water and impurities including lower boiling materials, so as to obtain aqueous liquid alcohol of high strength containing such lower boiling materials, and subjecting the alcohol of high strength obtained therefrom to purification to eliminate heads and then dehydration by distillation with a third liquid adapted to form an azeotropic mixture with the alcohol and water.

5. The continuous process which comprises distilling weak alcohol containing water and impurities including lower boiling materials, so as to obtain aqueous liquid alcohol of high strength containing such lower boiling materials, and subjecting the alcohol of high strength obtained therefrom to purification to eliminate heads and then dehydration by distillation with a third liquid adapted to form an azeotropic mixture with the alcohol and water.

6. The process which comprises distilling weak alcohol containing water and impurities containing fusel oil so as to obtain aqueous liquid alcohol of high strength containing fusel oil, subjecting the alcohol of high strength obtained therefrom to dehydration by distillation with a third liquid adapted to form an azeotropic mixture with the alcohol and water, removing fusel oil containing alcohol during the distillation of the weak alcohol and purifying the fusel oil by distillation.

7. The continuous process which comprises distilling weak alcohol containing water and impurities containing fusel oil so as to obtain aqueous liquid alcohol of high strength containing fusel oil, subjecting the alcohol of high strength obtained therefrom to dehydration by distillation with a third liquid adapted to form an azeotropic mixture with the alcohol and water, removing fusel oil containing alcohol during the distillation of the weak alcohol and purifying the fusel oil by distillation.

8. The process which comprises distilling weak alcohol containing water and impurities containing fusel oil so as to obtain aqueous liquid alcohol of high strength containing fusel oil, subjecting the alcohol of high strength obtained therefrom to dehydration by distillation with a third liquid adapted to form an azeotropic mixture with the alcohol and water, removing fusel oil containing alcohol during the distillation of the weak alcohol, purifying the fusel oil by distillation and dehydrating the alcohol separated out by the purification of the fusel oil together with the high strength alcohol.

9. The continuous process which comprises distilling weak alcohol containing water and impurities containing fusel oil so as to obtain aqueous liquid alcohol of high strength containing fusel oil, subjecting the alcohol of high strength obtained therefrom to dehydration by distillation with a third liquid adapted to form an azeotropic mixture with the alcohol and water, removing fusel oil containing alcohol during the distillation of the weak alcohol, purifying the fusel oil by distillation and dehydrating the alcohol separated out by the purification of the fusel oil together with the high strength alcohol.

10. The process which comprises distilling weak alcohol containing water and impurities containing fusel oil so as to obtain aqueous liquid alcohol of high strength containing fusel oil, subjecting the alcohol of high strength obtained therefrom to dehydration by distillation with a third liquid adapted to form an azeotropic mixture with the alcohol and water, removing fusel oil containing alcohol during the distillation of the weak alcohol and purifying the fusel oil by distillation and washing with water, the wash water being returned to the fusel oil being distilled.

11. The continuous process which comprises distilling weak alcohol containing water and impurities containing fusel oil so as to obtain aqueous liquid alcohol of high strength containing fusel oil, subjecting the alcohol of high strength obtained therefrom to dehydration by distillation with a third liquid adapted to form an azeotropic mixture with the alcohol and water, removing fusel oil containing alcohol during the distillation of the weak alcohol and purifying the fusel oil by distillation and washing with water, the wash water being returned to the fusel oil being distilled.

12. The process which comprises distilling a weak alcohol newly supplied to the process containing water so as to obtain aqueous liquid alcohol of high strength, subjecting the liquid alcohol of high strength obtained therefrom to dehydration by distillation with a third liquid adapted to form an azeotropic mixture with the alcohol and water so as to obtain a distillate forming separate liquid layers, one containing a higher percentage of alcohol than the other, and returning the layer containing the higher percentage of alcohol after the removal of the third liquid therefrom, to the weak alcohol being distilled.

13. The continuous process which comprises distilling a weak alcohol newly supplied to the process containing water so as to obtain aqueous liquid alcohol of high strength, subjecting the liquid alcohol of high strength obtained therefrom to dehydration by distillation with a third liquid adapted to form an azeotropic mixture with the alcohol and water so as to obtain a distillate forming separate liquid layers, one containing a higher percentage of alcohol than the other, and returning the layer containing the higher percentage of alcohol after the removal of the third liquid therefrom to the weak alcohol being distilled.

14. The process which comprises distilling a weak alcohol newly supplied to the process containing water so as to obtain aqueous liquid alcohol of high strength, subjecting the liquid alcohol of high strength obtained therefrom to dehydration by distillation with a third liquid adapted to form an azeotropic mixture with the alcohol and water so as to obtain a distillate forming separate liquid layers, one containing a higher percentage of alcohol and a lower percentage of the third liquid than the other, returning the layer containing the higher percentage of third liquid to the high strength alcohol being dehydrated by distillation and returning the layer containing the higher percentage of alcohol after the removal of the third liquid therefrom, to the weak alcohol being distilled.

15. The continuous process which comprises distilling a weak alcohol newly supplied to the process containing water so as to obtain aqueous liquid alcohol of high strength, subjecting the liquid alcohol of high strength obtained therefrom to dehydration by distillation with a third liquid adapted to form an azeotropic mixture with the alcohol and water so as to obtain a distillate forming separate liquid layers, one containing a higher percentage of alcohol and a lower percentage of the third liquid than the other, returning the layer containing the higher percentage of the third liquid to the high strength alcohol being dehydrated by distillation and returning the layer containing the higher percentage of alcohol after the removal of the third liquid therefrom to be distilled with the weak alcohol.

16. The process which comprises distilling weak alcohol newly supplied to the process containing water so as to obtain aqueous liquid alcohol of high strength, subjecting the alcohol of high strength obtained therefrom to dehydration by distillation with a third liquid adapted to form an azeotropic mixture with the alcohol and water so as to obtain a distillate forming separate liquid layers, one containing a higher percentage of alcohol than the other, and returning the layer containing the higher precentage of alcohol, after having passed through a washing operation, by means of a material adapted to remove said third liquid, to the weak alcohol being distilled.

17. The continuous process which comprises distilling a weak alcohol newly supplied to the process containing water so as to obtain aqueous liquid alcohol of high strength, subjecting the alcohol of high strength obtained therefrom to dehydration by distillation with a third liquid adapted to form an azeotropic mixture with the alcohol and water so as to obtain a distillate forming separate liquid layers, one containing a higher percentage of alcohol than the other, and returning the layer containing the higher percentage of alcohol, after having passed through a washing operation by means of a material adapted to remove said third liquid to the weak alcohol being distilled.

18. The process which comprises distilling weak alcohol newly supplied to the process containing water so as to obtain aqueous liquid alcohol of high strength, subjecting the alcohol of high strength obtained therefrom, while still warm, to dehydration by distillation with a third liquid adapted to form an azeotropic mixture with the alcohol and water, and subjecting the dehydrated alcohol to distillation to remove solid impurities therefrom.

19. The continuous process which comprises distilling weak alcohol newly supplied to the process containing water so as to obtain aqueous liquid alcohol of high strength, subjecting the alcohol of high strength obtained therefrom, while still warm, to dehydration by distillation with a third liquid adapted to form an azeotropic mixture with the alcohol and water, and subjecting the dehydrated alcohol to distillation to remove solid impurities therefrom.

In testimony that I claim the foregoing, I have hereunto set my hand this 5 day of May, 1925.

ELWOOD I. CLAPP.